(12) United States Patent
Vyas et al.

(10) Patent No.: US 7,897,295 B2
(45) Date of Patent: Mar. 1, 2011

(54) SURFACE ENGINEERING OF BIPOLAR PLATE MATERIALS FOR BETTER WATER MANAGEMENT

(75) Inventors: Gayatri Vyas, Rochester Hills, MI (US); Mahmoud H. Abd Elhamid, Grosse Pointe Woods, MI (US); Youssef M. Mikhail, Sterling Heights, MI (US); Thomas A. Trabold, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 724 days.

(21) Appl. No.: 11/313,161

(22) Filed: Dec. 20, 2005

(65) Prior Publication Data

US 2007/0141439 A1 Jun. 21, 2007

(51) Int. Cl.
*H01M 8/04* (2006.01)

(52) U.S. Cl. .................. 429/535; 429/457; 429/514; 427/115

(58) Field of Classification Search .................. 429/38; 427/115
See application file for complete search history.

(56) References Cited

U.S. PATENT DOCUMENTS

| 6,291,093 | B1 | 9/2001 | Kindler et al. |
| 6,291,094 | B1 | 9/2001 | Yoshimura et al. |
| 2003/0003345 | A1 | 1/2003 | Ohara et al. |
| 2003/0087143 | A1 | 5/2003 | Nakanishi et al. |
| 2003/0228512 | A1 | 12/2003 | Vyas et al. |
| 2004/0028967 | A1 | 2/2004 | Katsuki et al. |
| 2004/0081879 | A1 | 4/2004 | Washima et al. |
| 2005/0048347 | A1 | 3/2005 | Takashita et al. |
| 2006/0280992 | A1 | 12/2006 | Miyagawa |

FOREIGN PATENT DOCUMENTS

| JP | 2001-283880 | | 10/2001 |
| JP | 2002-343373 | A | 11/2002 |
| JP | 2003-272649 | | 9/2003 |

OTHER PUBLICATIONS

Vyas, G. et al., U.S. Utility patent application entitled "Method to Make Conductive Hydrophilic Fuel Cell Elements", U.S. Appl. No. 11/068,489, filed Feb. 28, 2005.

Vyas, G. et al., U.S. Utility patent application entitled "Durable Hydrophilic Coatings for Fuel Cell Bipolar Plates", U.S. Appl. No. 11/089,525, filed Mar. 24, 2005.

(Continued)

*Primary Examiner*—Ula C. Ruddock
*Assistant Examiner*—Thomas H. Parsons
(74) *Attorney, Agent, or Firm*—John A. Miller; Miller IP Group, PLC

(57) ABSTRACT

A flow field plate or bipolar plate for a fuel cell, where a surface of the flow field plate is textured or roughened to change the surface morphology of the plate. A conductive coating is deposited on the roughened surface where the roughness of the surface of the plate increases the hydrophilic nature of the coating. Therefore, if the coating is naturally hydrophobic, the surface roughness makes the coating hydrophilic to wick water away. If the coating is a conductive hydrophilic coating, then the surface roughness makes the coating super-hydrophilic, and may counter the effects of surface contamination that would act to make the hydrophilic coating less hydrophilic.

25 Claims, 2 Drawing Sheets

OTHER PUBLICATIONS

Vyas, G. et al., U.S. Utility patent application entitled "Metal Oxide Based Hydrophilic Coatings for PEM Fuel Cell Bipolar Plates", U.S. Appl. No. 11/089,526, filed Mar. 24, 2005.

Vyas, G. et al., U.S. Utility patent application entitled "Stable Conductive and Hydrophilic Fuel Cell Contact Element", U.S. Appl. No. 11/172,021, filed Jun. 30, 2005.

Vyas, G. et al., U.S. Utility patent application entitled Durability for the MEA and Bipolar Plates in PEM Fuel Cells using Hydrogen Peroxide Decomposition Catalysts, U.S. Appl. No. 11/196,632, filed Aug. 3, 2005.

Vyas, G. et al., U.S. Utility patent application entitled Fuel Cell Contact Element Including TiO2 Layer and a Conductive Layer, U.S. Appl. No. 11/201,767, filed Aug. 11, 2005.

Vyas, G. et al., U.S. Utility patent application entitled Improving the Water Management Properties of PEM Fuel Cell Bipolar Plates using Carbon Nano Tube Coatings, U.S. Appl. No. 11/215,105, filed Aug. 30, 2005.

SURFACE ENGINEERING OF BIPOLAR PLATE MATERIALS FOR BETTER WATER MANAGEMENT

BACKGROUND OF THE INVENTION

1. Field of the Invention

This invention relates generally to bipolar plates for fuel cells and, more particularly, to a bipolar plate for a fuel cell that includes a hydrophobic or hydrophilic coating deposited on a roughened surface of the plate.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are popular fuel cells for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane defines a membrane electrode assembly (MEA).

Several fuel cells are typically combined in a fuel cell stack to generate the desired power. For the automotive fuel cell stack mentioned above, the stack may include two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of flow field or bipolar plates positioned between the several MEAs in the stack. The bipolar plates include an anode side and a cathode side for adjacent fuel cells in the stack. Anode gas flow channels are provided on the anode side of the bipolar plates that allow the anode gas to flow to the anode side of the MEA. Cathode gas flow channels are provided on the cathode side of the bipolar plates that allow the cathode gas to flow to the cathode side of the MEA. The bipolar plates also include flow channels through which a cooling fluid flows.

The bipolar plates are typically made of a conductive material, such as stainless steel, titanium, aluminum, polymeric carbon composites, etc., so that they conduct the electricity generated by the fuel cells from one cell to the next cell and out of the stack. Metal bipolar plates typically produce a natural oxide on their outer surface that makes them resistant to corrosion. However, the oxide layer is not conductive, and thus increases the internal resistance of the fuel cell, reducing its electrical performance. Also, the oxide layer makes the plate more hydrophobic. It is known in the art to deposit a thin layer of a conductive material, such as gold, on the bipolar plates to reduce the contact resistance between the plate and diffusion media in the fuel cells.

As is well understood in the art, the membranes within a fuel cell need to have a certain relative humidity so that the ionic resistance across the membrane is low enough to effectively conduct protons. During operation of the fuel cell, moisture from the MEAs and external humidification may enter the anode and cathode flow channels. At low cell power demands, typically below 0.2 A/cm$^2$, the water may accumulate within the flow channels because the flow rate of the reactant gas is too low to force the water out of the channels. As the water accumulates, it forms droplets that continue to expand because of the relatively hydrophobic nature of the plate material. The droplets form in the flow channels substantially perpendicular to the flow of the reactant gas. As the size of the droplets increases, the flow channel is closed off, and the reactant gas is diverted to other flow channels because the channels are in parallel between common inlet and outlet manifolds. Because the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because the fuel cells are electrically coupled in series, if one of the fuel cells stops performing, the entire fuel cell stack may stop performing.

It is usually possible to purge the accumulated water in the flow channels by periodically forcing the reactant gas through the flow channels at a higher flow rate. However, on the cathode side, this increases the parasitic power applied to the air compressor, thereby reducing overall system efficiency. Moreover, there are many reasons not to use the hydrogen fuel as a purge gas, including reduced economy, reduced system efficiency and increased system complexity for treating elevated concentrations of hydrogen in the exhaust gas stream.

Reducing accumulated water in the channels can also be accomplished by reducing inlet humidification. However, it is desirable to provide some relative humidity in the anode and cathode reactant gases so that the membrane in the fuel cells remains hydrated. A dry inlet gas has a drying effect on the membrane that could increase the cell's ionic resistance, and limit the membrane's long-term durability.

It has been proposed by the present inventors to make bipolar plates for a fuel cell hydrophilic to improve channel water transport. A hydrophilic plate causes water in the channels to form a thin film that has less of a tendency to alter the flow distribution along the array of channels connected to the common inlet and outlet headers. If the plate material is sufficiently wettable, water transport through the diffusion media will contact the channel walls and then, by capillary force, be transported into the bottom corners of the channel along its length. The physical requirements to support spontaneous wetting in the corners of a flow channel are described by the Concus-Finn condition, $$\beta + \frac{\alpha}{2} < 90°,$$

where $\beta$ is the static contact angle and $\alpha$ is the channel corner angle. For a rectangular channel $\alpha/2=45°$, which dictates that spontaneous wetting will occur when the static contact angle is less than 45°. For the roughly rectangular channels used in current fuel cell stack designs with composite bipolar plates, this sets an approximate upper limit on the contact angle needed to realize the beneficial effects of hydrophilic plate surfaces on channel water transport and low load stability.

SUMMARY OF THE INVENTION

In accordance with the teachings of the present invention, a flow field plate or bipolar plate for a fuel cell is disclosed, where a surface of the flow field plate is textured or roughened to change the surface morphology of the plate. A conductive coating is deposited on the roughened surface where the roughness of the surface of the plate increases the hydrophilic nature of the coating. Therefore, if the coating is naturally hydrophobic (water contact angle of 90°), the surface roughness makes the coating hydrophilic to wick water away. If the coating is a conductive hydrophilic coating (water contact angle of 40°), then the surface roughness makes the coating super-hydrophilic (water contact angle of 0°), and may counter the effects of surface contamination that would act to make the hydrophilic coating less hydrophilic.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a bipolar plate for a fuel cell that includes a roughened surface to make a coating deposited thereon more hydrophilic is merely exemplary in nature, and is in no way intended to limit the invention or its applications or uses.

Figure 1:
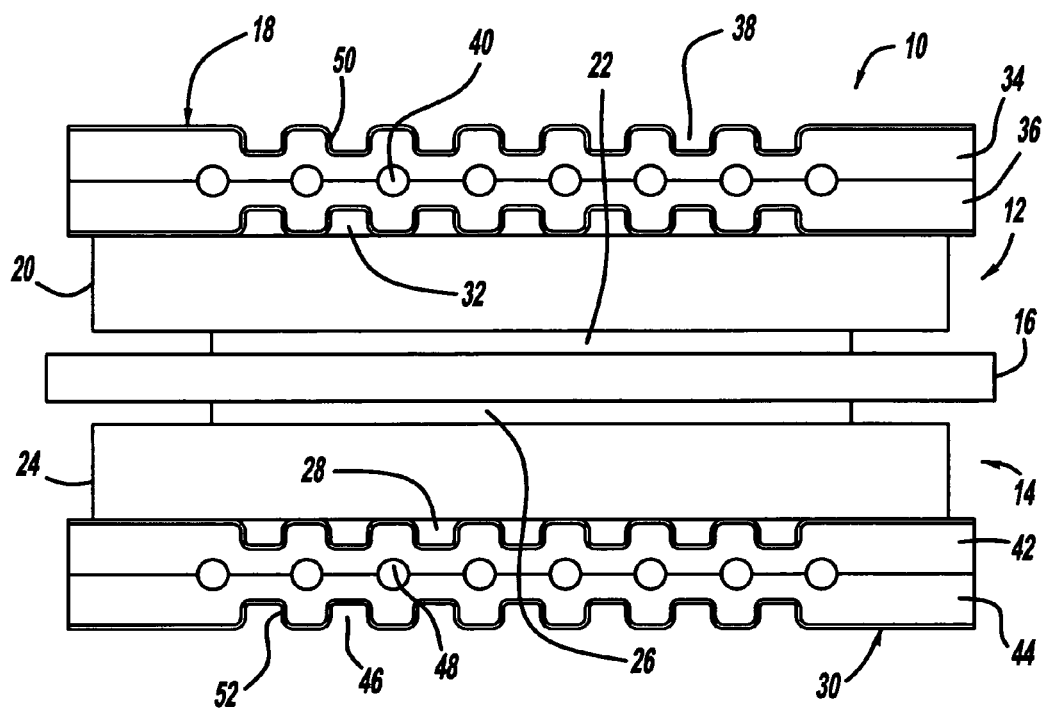
FIG. 1 is a cross-sectional view of a fuel cell in a fuel cell stack that includes a bipolar plate having a hydrophobic or hydrophilic coating, where the surface of the plate has been textured to make the coating more hydrophilic.

FIG. 1 is a cross-sectional view of a fuel cell 10 that is part of a fuel stack of the type discussed above. The fuel cell 10 includes a cathode side 12 and an anode side 14 separated by a perfluorosulfonic acid membrane 16. A cathode side diffusion media layer 20 is provided on the cathode side 12, and a cathode side catalyst layer 22 is provided between the membrane 16 and the diffusion media layer 20. Likewise, an anode side diffusion media layer 24 is provided on the anode side 14, and an anode side catalyst layer 26 is provided between the membrane 16 and the diffusion media layer 24. The catalyst layers 22 and 26 and the membrane 16 define an MEA. The diffusion media layers 20 and 24 are porous layers that provide for input gas transport to and water transport from the MEA. Various techniques are known in the art for depositing the catalyst layers 22 and 26 on the diffusion media layers 20 and 24, respectively, or on the membrane 16.

A cathode side flow field plate or bipolar plate 18 is provided on the cathode side 12 and an anode side flow field plate or bipolar plate 30 is provided on the anode side 14. The bipolar plates 18 and 30 are provided between the fuel cells in the fuel cell stack. A hydrogen reactant gas flow from flow channels 28 in the bipolar plate 30 reacts with the catalyst layer 26 to dissociate the hydrogen ions and the electrons. Airflow from flow channels 32 in the bipolar plate 18 reacts with the catalyst layer 22. The hydrogen ions are able to propagate through the membrane 16 where they carry the ionic current through the membrane. The by-product of the electrochemical reaction is water.

In this non-limiting embodiment, the bipolar plate 18 includes two sheets 34 and 36 that are formed separately and then joined together. The sheet 36 defines the flow channels 32 and the sheet 34 defines flow channels 38 for the anode side of an adjacent fuel cell to the fuel cell 10. Cooling fluid flow channels 40 are provided between the sheets 34 and 36, as shown. Likewise, the bipolar plate 30 includes a sheet 42 defining the flow channels 28, a sheet 44 defining flow channels 46 for the cathode side of an adjacent fuel cell, and cooling fluid flow channels 48. In the embodiments discussed herein, the sheets 34, 36, 42 and 44 are made of an electrically conductive material, such as stainless steel, titanium, aluminum, polymeric carbon composites, etc.

The bipolar plate 18 includes a conductive coating 50 and the bipolar plate 30 includes a conductive coating 52 that are provided to reduce the contact resistance between the plate 18 and 30 and the diffusion media layers 20 and 24, respectively. Various materials are known in the art for this purpose, such as gold, platinum, ruthenium, rhodium and other noble metals. Other coatings comprised of carbon and a polymer binder can also be used. Typically the coatings 50 and 52 will be deposited to a thickness of about 10-100 nm. However, these materials are sometimes hydrophobic in nature in that they have a surface energy that causes water to bead up and form droplets that have a high contact angle relative to the flow field channels, as discussed above. For stack stability purposes, especially at low loads, it is desirable that the surface of the plates 18 and 30 be hydrophilic so that water will wick away and have a low contact angle, preferably below 20°.

Figure 2:
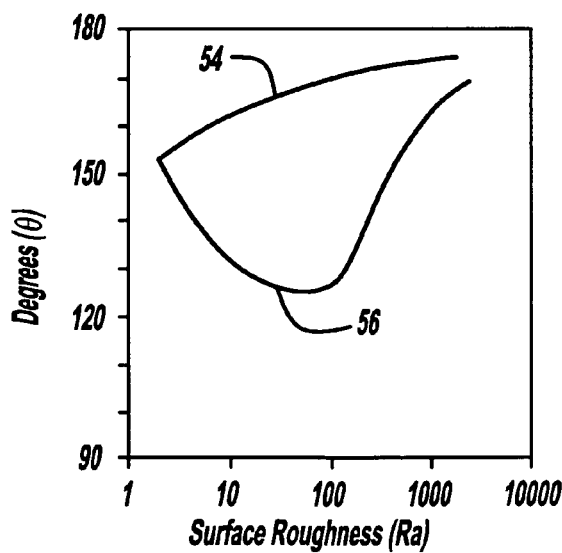
FIG. 2 is a graph with surface roughness on the horizontal axis and degrees on the vertical axis showing the advancing and receding water contact angles for a certain material.

It has been discovered that roughening a substrate affects its water contact angle and improves the wetting of wetting liquids, but degrades wetting of non-wetting liquids. FIG. 2 is a graph with surface roughness (Ra) on the horizontal axis and degrees (θ) on the vertical axis showing the advancing contact angle θa and the receding contact angle θr formed by liquid mercury on sapphire (Hg/Al$_2$O$_3$). Particularly, graph line 54 shows the advancing contact angle and graph line 56 shows the receding contact angle. FIG. 2 shows that for a very small surface roughness, the hysteresis domain is only a few degrees and the contact angle can be given with precision. With increasing surface roughness, the contact angle hysteresis increases, then decreases tending towards zero for very rough surfaces, where there is no pinning of droplets to the surface.

According to the invention, the surface of the bipolar plates 18 and 30 is textured or roughened prior to the coatings 50 and 52 being deposited. The roughness of the surface of the bipolar plates 18 and 30 is usually a function of crystal orientation, impurities on the surface, grain boundaries and dislocation. Because the coatings 50 and 52 are very thin, generally on the order of 10-100 nm, the contour of the coatings 50 and 52 will follow the roughened contour of the surfaces of the bipolar plates 18 and 30. It has been shown that by providing a textured surface morphology of the coatings 50 and 52 in this manner, a hydrophobic material can be made hydrophilic so that the contact angle of water forming in the flow field channels is reduced and its ability to wick water away is increased, thus helping stack stability. Particularly, the surface energy of the material will be reduced so that the advancing and receding contact angle of the water in the flow field channels is about equal. The amount of roughening of the surface to provide the desired hydrophilicity for the coatings 50 and 52 can be identified by experimentation for particular plate materials. In one embodiment, the variation between the peaks and valleys of the surface roughness of the bipolar plates 18 and 30 will be on the order of 500-10,000 nm.

In another embodiment, the coatings 50 and 52 may be hydrophilic coatings, such as metal oxides including silicon dioxide, titanium dioxide, tin dioxide, tantalum oxide, etc. These coatings are intended to provide the desirable contact resistance discussed above and the desired hydrophilicity. However, these materials are sometimes prone to contamination during fuel cell operation that reduces their hydrophilicity. By roughening the surface of the plates 18 and 30 as discussed above, the naturally hydrophilic materials can be made more hydrophilic, and thus, counteract the affect of surface contamination.

Further, electrical contact resistance can be maintained between the bipolar plates 18 and 30 and the diffusion media layers 20 and 24, respectively, by masking the lands between the flow channels 28 and 32 when the coatings 50 and 52 are being deposited so that the coating material is not deposited on the lands. Various masking techniques can be employed, such as water soluble masks, photolithography masks, or any other physical masks and combinations thereof.

Before the coatings 50 and 52 are deposited on the bipolar plates 18 and 30 and before the surface of the plate 18 and 30 are roughened, the bipolar plates 18 and 30 are cleaned by a suitable process, such as ion beam sputtering, to remove the resistive oxide film on the outside of the plates 18 and 30 that may have formed. The coatings 50 and 52 can be deposited on the bipolar plates 18 and 30 by any suitable technique including, but not limited to, physical vapor deposition processes, chemical vapor deposition (CVD) processes, thermal spraying processes, spin coating processes, dip coating processes and sol-gel processes. Suitable examples of physical vapor deposition processes include electron beam evaporation, magnetron sputtering and pulsed plasma processes. Suitable chemical vapor deposition processes include plasma enhanced CVD and atomic layer deposition processes.

Figure 3:
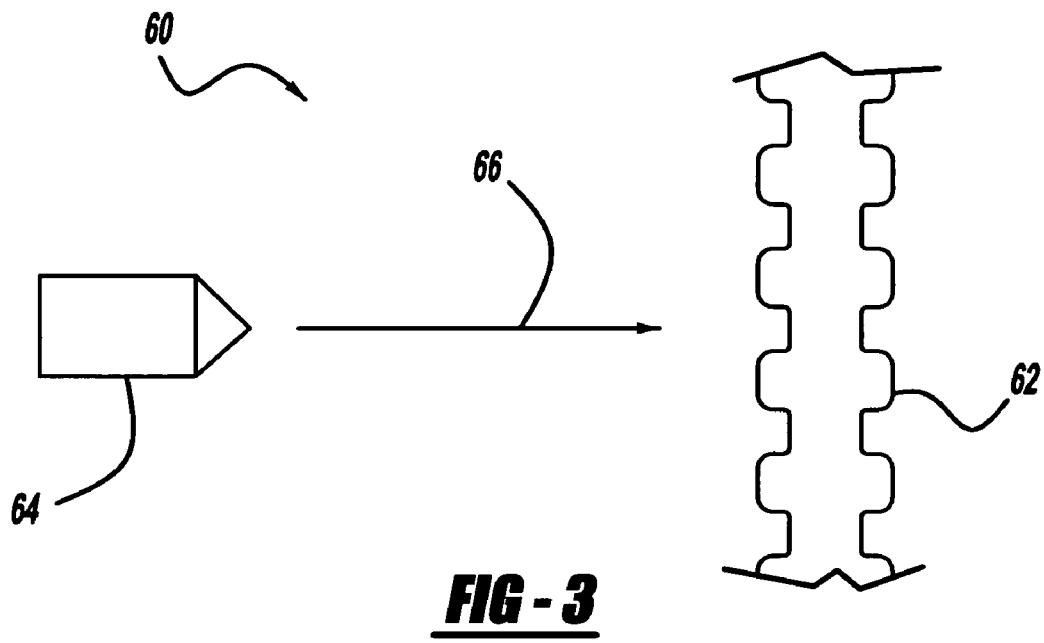
FIG. 3 is a simplified view of a system for roughening the surface of a bipolar plate.

The process of texturing the surfaces of the bipolar plates 18 and 30 can be performed by any suitable process. FIG. 3 is a simplified view of a system 60 for roughening the surface of a bipolar plate 62. A suitable device 64 emits a stream 66 of material at the bipolar plate 62 to cause the imperfections and dislocations that would roughen the surface of the plate 62. The force of bombardment and the direction of bombardment of the stream 66 can be used to selectively texture the surface of the plate 62. In one embodiment, the system 60 employs a physical process, such as a water jet that emits a water stream that roughens the surface of the plate 62. In another embodiment, the roughening can be performed by chemical methods, such as a chromic acid etching process, or other suitable etching process. In another embodiment, light enhanced methods can be used, such as a laser process, to roughen the surface of the plate 62.

Figure 4:
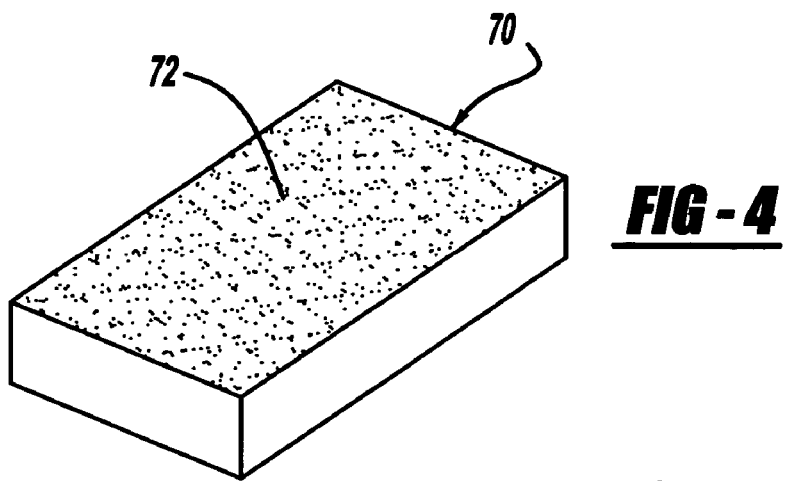
FIG. 4 is a perspective view of a plate of steel having a surface that has not been roughened.
Figure 5:
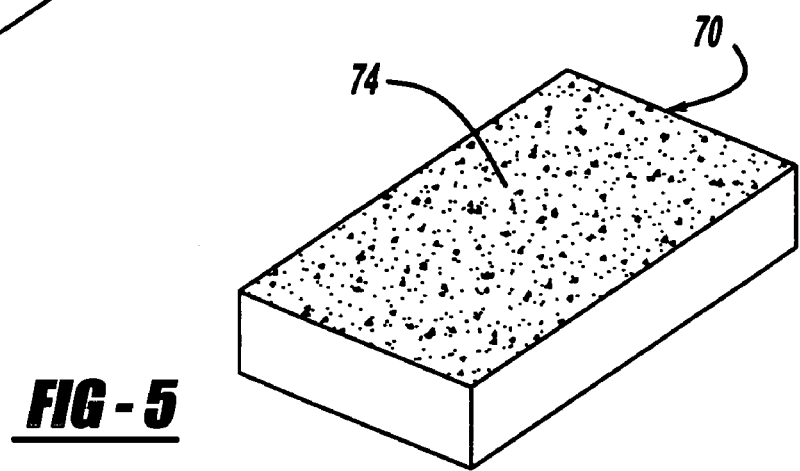
FIG. 5 is a perspective view of the plate of steel shown in FIG. 4 that has been roughened by a water jet.

FIGS. 4 and 5 are provided to show the difference between a steel plate 70 having a relatively smooth surface 72 and the steel plate 70 having a roughened surface 74 to provide the hydrophilicity of the coatings 50 and 52 as discussed above. In the discussion below, Rz is the average of the ten greatest peaks-to-valley separation on the surfaces 72 and 74. The stylus X-Y analysis provides a method for correlating results to those you would obtain from stylus measurements. The X slope is the rate of change of the surfaces 72 and 74 in the X direction, i.e., the first derivative of the surface data or the rate of change of the surface. The X slope can be calculated by comparing the height of one point with the height of the next point in the X direction. The Y slope can be calculated similarly. The surface area of the plate 70 is the total exposed area on the surface 72 including the peaks and valleys. The normalized volume is the ratio of the volume to the lateral area measured in billions of cubic microns per square inch. The volume is the volume the surfaces 72 and 74 would hold if they were covered just to the top surface of the highest peak.

In this example, the steel plate 70 is stainless steel 316L. The roughness of the surface 72 is defined as Ra=0.13 um, Rq=0.17 um, Rz=1.14 um, stylus X=4.51 mm, stylus Y=13.41 mm, X slope=13.32 mrad, Y slope=38.58 mrad, surface area=0.27602008 $mm^2$, lateral area=0.27577007 $mm^2$, normalized volume=0.26 BCM, and volume=111000.77 $um^3$.

In FIG. 5, the steel plate has been roughened by a water jet to provide the roughened surface 74 for the bipolar plate 18 and 30 in the manner as discussed above. The roughness of the surface 74 is defined as Ra=7.75 um, Rq=9.90 um, Rz=64.47 um, stylus X=4.17 mm, stylus Y=4.03 mm, X slope=503.97 mrad, Y slope=499.58 mrad, surface area=0.37252936 $mm^2$, normalized volume=11,86 BCM, and volume=5070522 $um^3$.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell comprising a flow field plate being made of a plate material, said flow field plate including a plurality of flow channels responsive to a reactant gas, said flow field plate further including a coating deposited on its outer surface, wherein the outer surface of the flow field plate is roughened prior to the coating being deposited on the plate so as to make the plate more hydrophilic.

2. The fuel cell according to claim 1 wherein the plate material is selected from the group consisting of stainless steel, titanium, aluminum and a polymer-carbon deposit based material.

3. The fuel cell according to claim 1 wherein the coating is a metal oxide.

4. The fuel cell according to claim 1 wherein the coating is a metal.

5. The fuel cell according to claim 1 wherein the coating is a hydrophilic coating.

6. The fuel cell according to claim 1 wherein the coating is a hydrophobic coating.

7. The fuel cell according to claim 1 wherein the coating has a thickness in the range of 10-100 nm.

8. The fuel cell according to claim 1 wherein the surface of the flow field plate is roughened to be in the range of 500-10,000 nm.

9. The fuel cell according to claim 1 wherein the surface of the flow field plate is roughened by a process selected from the group consisting of physical methods, chemical methods, light enhanced methods and combinations thereof.

10. The fuel cell according to claim 1 wherein lands between the flow channels are masked when the coating is deposited on the flow field plate to prevent the coating material from being deposited on the lands to provide a good contact resistance for the fuel cell.

11. The fuel cell according to claim 1 wherein the flow field plate is selected from the group consisting of anode side flow field plates and cathode side flow field plates.

12. The fuel cell according to claim 1 wherein the fuel cell is part of the fuel cell stack on a vehicle.

13. A fuel cell stack comprising a plurality of fuel cells, each fuel cell including:
   a membrane;
   an anode side bipolar plate on one side of the membrane, said anode side bipolar plate including a roughened surface, said anode side bipolar plate further including a coating deposited on the roughened surface so as to make the anode side bipolar plate more hydrophilic; and
   a cathode side bipolar plate on the other side of the membrane, said cathode side bipolar plate including a roughened surface, said cathode side bipolar plate further including a coating deposited on the roughened surface so as to make the cathode side bipolar plate more hydrophilic.

14. The fuel cell stack according to claim 13 wherein the surface of the bipolar plates are roughened to be in the range of 500-10,000 nm.

15. The fuel cell stack according to claim 13 wherein the coatings are naturally hydrophobic coatings.

16. The fuel cell stack according to claim 13 wherein the coatings are naturally hydrophilic coatings.

17. The fuel cell stack according to claim 13 wherein lands between flow channels in the anode side and cathode side bipolar plates are masked when the coating is deposited on the bipolar plates to prevent the coating material from being deposited on the lands to provide a good contact resistance for the fuel cell stack.

18. The fuel cell stack according to claim 13 wherein the surface of the bipolar plates is roughened by a process selected from the group consisting of physical methods, chemical methods, light enhanced methods and combinations thereof.

19. A method for making a flow field plate for a fuel cell, said method comprising:
   providing a base structure being made of a plate material;
   roughing a surface of the base structure so as to make the plate more hydrophilic; and
   depositing a coating on the roughened surface of the base structure.

20. The method according to claim 19 wherein the coating is a hydrophilic coating.

21. The method according to claim 19 wherein the coating is a hydrophobic coating.

22. The method according to claim 19 wherein depositing the coating includes depositing the coating to a thickness in the range of 10-100 nm.

23. The method according to claim 19 wherein roughening the surface of the bipolar plates includes roughening the surface to be in the range of 500-10,000 nm.

24. The method to claim 19 wherein roughening the surface of the bipolar plates includes roughening the surface of the bipolar plates by a process selected from the group consisting of physical methods, chemical methods, light enhanced methods and combinations thereof.

25. The method according to claim 19 wherein depositing a coating on the roughened surface of the base structure includes masking lands between flow channels in the base structure so that when the coating is deposited on the base structure, coating material is prevented from being deposited on the lands to provide a good contact resistance for the fuel cell.

* * * * *